United States Patent

[11] 3,596,074

[72] Inventor Nicholas S. Mitrofanoff
Rochester, Minn.
[21] Appl. No. 832,684
[22] Filed June 12, 1969
[45] Patented July 27, 1971
[73] Assignee International Business Machines Corporation
Armonk, N.Y.

[54] SERIAL BY CHARACTER MULTIFUNCTIONAL MODULAR UNIT
9 Claims, 9 Drawing Figs.

[52] U.S. Cl. .......... 235/174, 235/175, 235/176
[51] Int. Cl. .......... G06f 7/50
[50] Field of Search .......... 235/174, 175, 176

[56] References Cited

UNITED STATES PATENTS

| | | | |
|---|---|---|---|
| 3,317,721 | 5/1967 | Berlind .......... | 235/176 |
| 3,400,259 | 9/1968 | Maczko et al. .......... | 235/175 X |
| 3,417,236 | 12/1968 | Utley .......... | 235/175 |
| 3,488,481 | 1/1970 | Franck .......... | 235/175 |

*Primary Examiner*—Malcolm A. Morrison
*Assistant Examiner*—David H. Malzahn
*Attorneys*—Hanifin and Jancin and Donald F. Voss

ABSTRACT: An arithmetic and logic unit consisting of a plurality of interconnected logic modules, each module operating as a subtracter in a manner that one operand is base data and the other is a modifier and controlled to perform the functions of Binary Add and Subtract, Decimal Add and Subtract, Logical AND and OR, Exclusive OR, Set Bits On-Off, Test Bits On-Off, and passing either operand (Move Operand One, Move Operand Two).

INVENTOR
NICHOLAS S. MITROFANOFF
BY Donald F Voss
ATTORNEY

SERIAL BY CHARACTER MULTIFUNCTIONAL MODULAR UNIT

BACKGROUND OF THE INVENTION

1. Field of the Invention

This invention relates to arithmetic and logic units and more particularly to such units where one operand is considered subservient to the other and still more particularly where the carry signal is limited to arithmetic functions of the unit and is excluded from the logical operations.

2. Description of the Prior Art

Heretofore, arithmetic and logic units were more complex and expensive because they included the carry signal in both the arithmetic and logic functions as seen in U.S. Pat. No. 3,317,721 and because the operands are not operated upon in a fashion that one operand is considered subservient to the other. Additionally, prior art devices do not include the variety of arithmetic and logical functions which can be performed by this invention. The present invention is configured as a parallel subtracter for the arithmetic functions, i.e., addition and subtraction, and both binary and decimal arithmetic can be performed. Further, the subtracter configuration has an advantage because the "six correct" operation for decimal arithmetic is only dependent upon the carry signal out of the high-order bit position. The number of logic functions are expanded and require only three control lines to perform the operations of Move Operand One, Move Operand Two, AND, OR, Set Bits On, Set Bits Off, Exclusive OR, Test Bits On and Test Bits Off. The arithmetic and logic unit of U.S. Pat. No. 3,417,236, for example, cannot perform decimal arithmetic and has a more limited repertoire of logical functions. Also, the invention of this patent, which is directed to a binary adder, requires additional cycles as long as carries are generated. In the present invention, the arithmetic and logic unit requires only one cycle for its operation in either mode. When operating in the arithmetic mode, all carries are propogated during this one cycle of operation. The unit can be expanded or contracted on a modular basis to any size desired.

SUMMARY OF THE INVENTION

The principal object of the invention is to provide an improved arithmetic and logic unit which is( (a) relatively simple in construction and inexpensive, (b) in modular form, (c) expandable without increasing cycle time of operation (d) relatively fast in operation and (e) suited to high-density electronic packaging.

Figure 1:
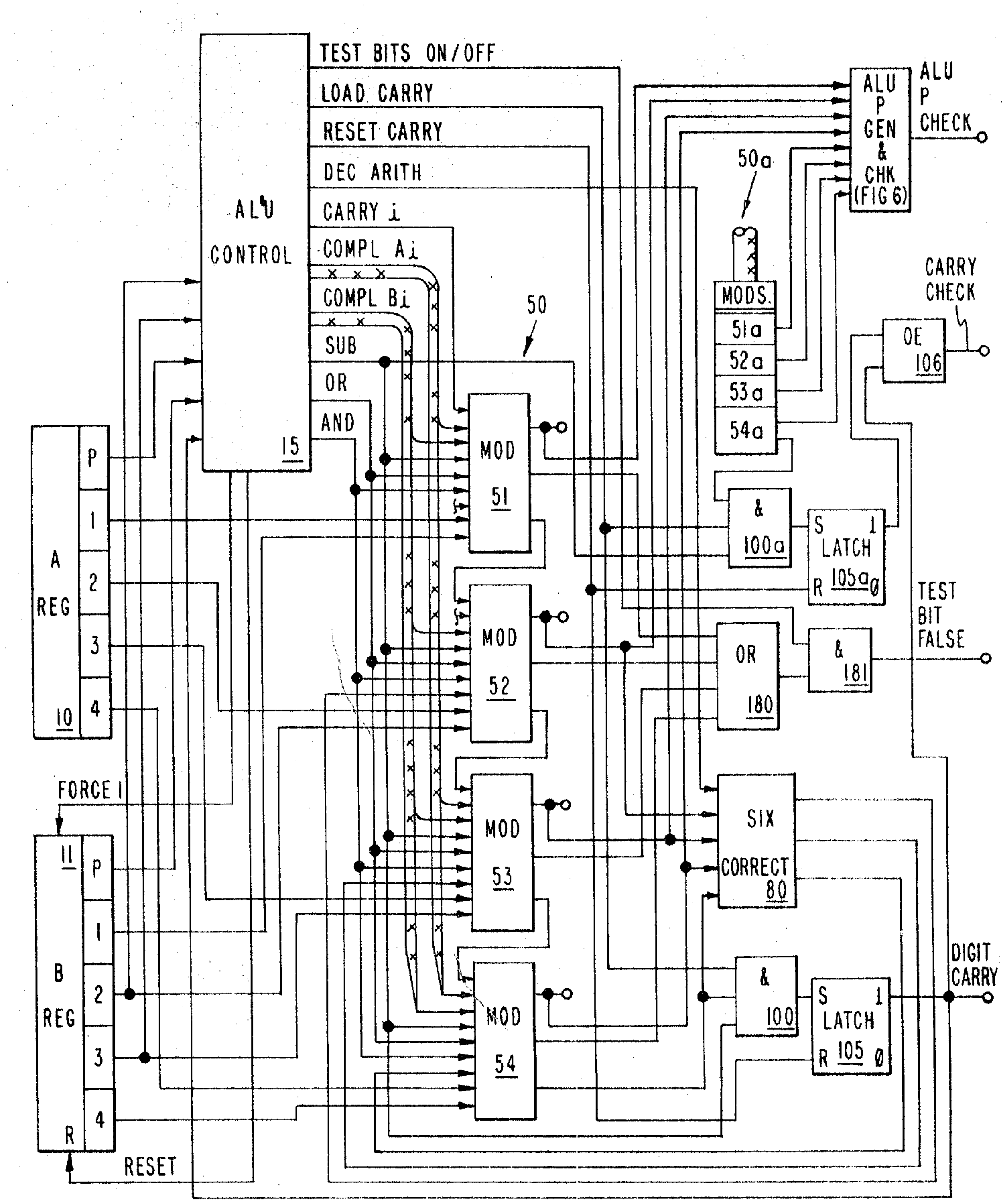
FIG. 1 is a schematic diagram illustrating the invention in block form.

With reference to the drawings, and particularly to FIG. 1, the operands are held in registers 10 and 11. Normally, registers 10 and 11 would be contained in a central processing unit (CPU) of a computer in which the invention finds particular utility. General purpose digital computers require circuits which perform arithmetic functions such as addition and subtraction and logic functions, including logical AND and OR, Exclusive OR, Set Bits On-Off, Test Bits On-Off and Move Operands One and Two. For purposes of simplicity, registers 10 and 11 are shown as having data positions for four data bits and one parity bit respectively. In actual practice, the number of bit positions in the registers is a function of the CPU data format. For example, many CPU's or computers, such as the IBM System 360, are structured on an eight-bit byte basis. The byte is a basic building block of all the formats. A ninth-bit, parity or check bit, is transmitted with each byte and carries odd parity on the byte. The bytes may be handled separately or grouped together in fields. Decimal digits 0—9 are represented in the four bit binary-coded decimal form. The other four bits in the byte can be used for sign codes or two decimal digits can be contained in the byte. The invention will be described later herein, with respect to an eight-bit byte, but at this time only four bits plus parity will be considered.

Normally, the controls for the arithmetic and logic unit would be in a central processing unit of a computer. In this particular example, the controls are shown as contained in block 15 of FIG. 1. ALU control 15 provides signals to the modular units 50, there being one module for each data bit. The details of the module are shown in FIG. 2.

Figures 2, 3, 5:
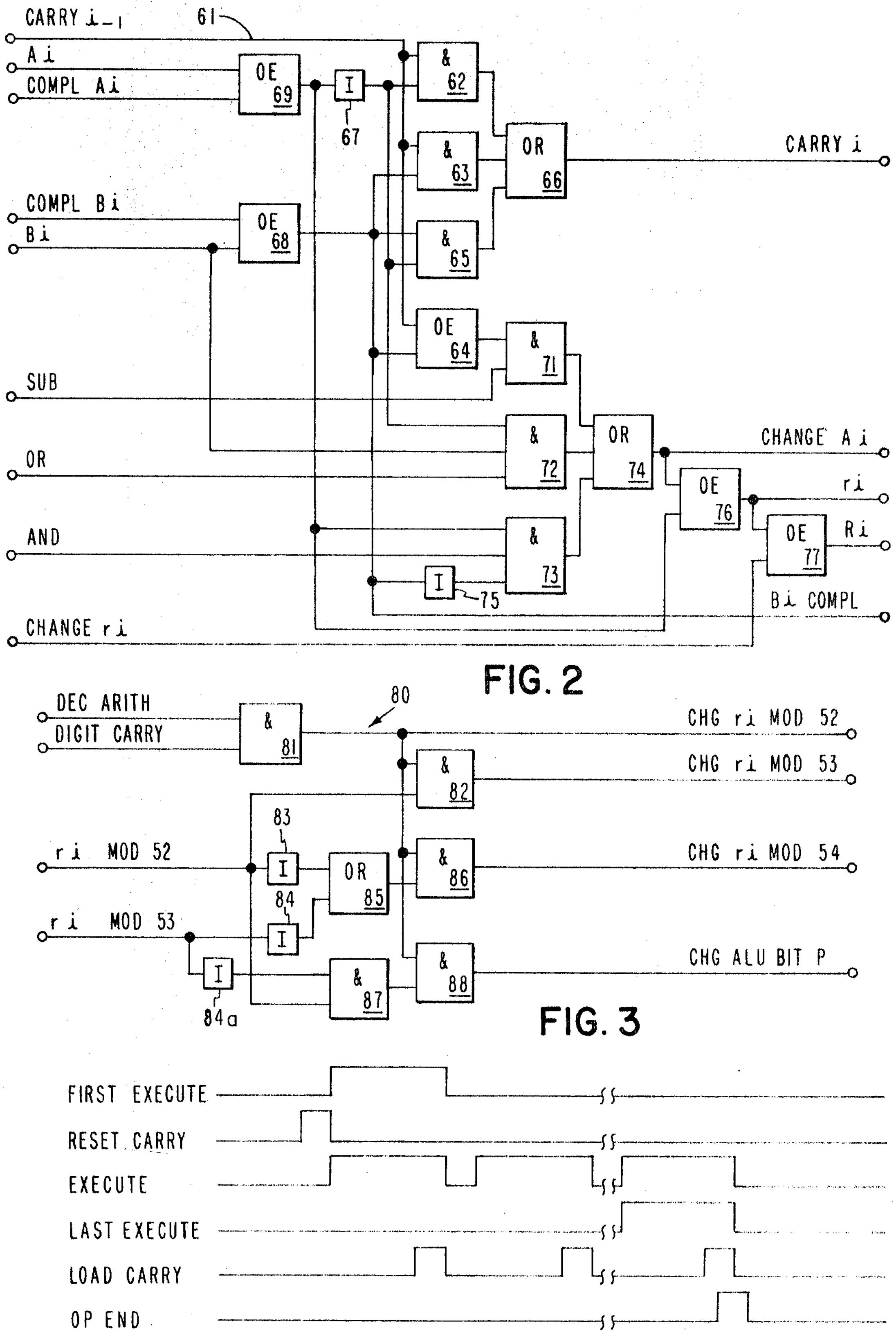
FIG. 2 is a schematic diagram showing the details of an arithmetic and logic unit module which is shown in block form in FIG. 1.
FIG. 3 is a schematic logic diagram illustrating the detailed logic of the six correct circuitry.
FIG. 5 is a timing diagram.

With reference to FIG. 2, it is seen that each module 50 has a carry-in input conductor 61 which is applied to AND circuits 62 and 63, and exclusive OR circuit 64. AND circuit 62 also has an input connected to the output of inverter 67. AND circuit 63 and exclusive OR circuit 64 have inputs connected to the output of exclusive OR circuit 68. These circuits are i known in the art and further description of them is not required. The outputs of AND circuits 62 and 63 are applied to inputs of OR circuit 66, which also has an input connected to the output of AND circuit 65. AND circuit 65 has inputs connected to the outputs of inverter 67 and exclusive OR circuit 68. Inverter 67 has its input connected to the output of exclusive OR circuit 69, the same having an input connected to one of the bit positions of register 10 and an input connected to control 15 for receiving a Complement $A_i$ signal. Exclusive OR circuit 68 has an input connected to one of the data bit positions of register 11 and an input connected to control 15 for receiving a Complement $B_i$ signal. It is thus seen that the carryout signal is passed by OR circuit 66 according to the following Boolean statement:

$$C_O=\overline{A_i}\cdot C_i+B_i\cdot C_i+\overline{A_i}\cdot B_i$$

Control unit 15 provides a Subtract control signal to AND circuit 71 for arithmetic operations and OR and AND signals to AND circuits 72 and 73 for logical operations. The outputs of AND circuits 71, 72 and 73 are applied as inputs to OR circuit 74. The output of OR circuit 74 determines whether the bit in register 10, i.e., the base data, is to be changed. Hence, the output of OR circuit 74 together with the output of exclusive OR circuit 69 are applied as inputs to exclusive OR circuit 76.

AND circuit 71 in addition to the Subtract control input also has an input from exclusive OR circuit 64. Assuming that the modules 50 operate according to positive logic rules, exclusive OR 64 will have a one output according to the following Boolean expression:

$$\overline{B_i}\cdot C_i+B_i\cdot\overline{C_i}$$

AND circuit 71 will develop a change $A_i$ signal whenever this Boolean expression is satisfied and the Subtract control signal is provided by control 15. As will be explained in more detail later herein, Binary Subtraction, i.e., factor A minus factor B, is performed by simply applying the Subtract signal to AND circuits 71 of the modules 50. Binary Addition is performed by forcing a carry-in signal, $C_i$, to the low order bit module 51 and providing Complement $B_i$ and Subtract control signals to all of the modules 51—54 inclusive. It is understood that a binary arithmetic unit of any size can be constructed by connecting the required number of the modules together in the manner shown in FIG. 1.

The modules 50 are also connected as a Decimal arithmetic unit for a single digit. Decimal Subtraction, factor A minus Factor B, is performed by providing a Subtract signal to the modules 50 and if there is a carryout signal from the high-order bit position module 54, the difference is six corrected. The six correct logic 80 is shown in detail in FIG. 3.

The output $r_i$ from exclusive OR circuit 76, FIG. 2, of the low-order bit module 51, FIG. 1, is not applied to the six correct circuit 80 because this output is never changed. The $r_i$ output from exclusive OR circuit 76 of the module 52 is always changed. The change signal is developed by applying the Decimal Arithmetic signal to AND circuit 81, FIG. 3, together with the Digit Carry signal from module 54 of FIG. 1. The output of AND circuit 81 is applied to exclusive OR circuit 77 of module 52 as a Change $r_i$ signal.

The $r_i$ output of module 53 is changed if the $r_i$ output of module 52 is a one. This is accomplished by applying the output of AND circuit 81 to an input of AND circuit 82 together with the $r_i$ output from module 52. The output of AND circuit 82 is applied to exclusive OR circuit 77 of module 53 as a Change $r_i$ signal.

The $r_i$ output of module 54 is changed if the $r_i$ outputs of modules 52 and 53 are zero. The $r_i$ outputs of modules 52 and 53 are applied to inverters 83 and 84 respectively. The outputs of these inverters are applied to inputs of OR circuit 85 which in turn has its output applied to AND circuit 86. AND circuit 86 also has an input connected to the output of AND circuit 81. The output of AND circuit 86 is applied as the Change $r_i$ signal to exclusive OR circuit 77 of module 54.

The output of inverter 84 is applied as an input to AND circuit 87 which also has an input from exclusive OR circuit 76 of module 52. The outputs of AND circuits 81 and 87 are applied to inputs of AND circuit 88 whose output is indicative of Change ALU Bit P.

Decimal Addition is performed by forcing a carry-in signal $C_i$ to the low-order module 51 and applying Complement $B_i$ and Subtract signals to all of the modules 50. It should be noted that when doing a Decimal Addition, the nine's complement is used whereas for Binary Addition, the 15's complement is used. This will be apparent from the description of the ALU control circuit 15. Also six correction is performed when doing Decimal Addition if there is a carryout of the high-order bit position module 54. It should be noted that the six correct decision for Decimal Arithmetic is dependent only on the carryout signal from the high order bit position. A packed Decimal Arithmetic unit of any size can be constructed by connecting the required number of four-bit arithmetic units. Further, if desired, two of the four-bit arithmetic units can be used to form an eight-bit zoned decimal configuration.

Figure 4:
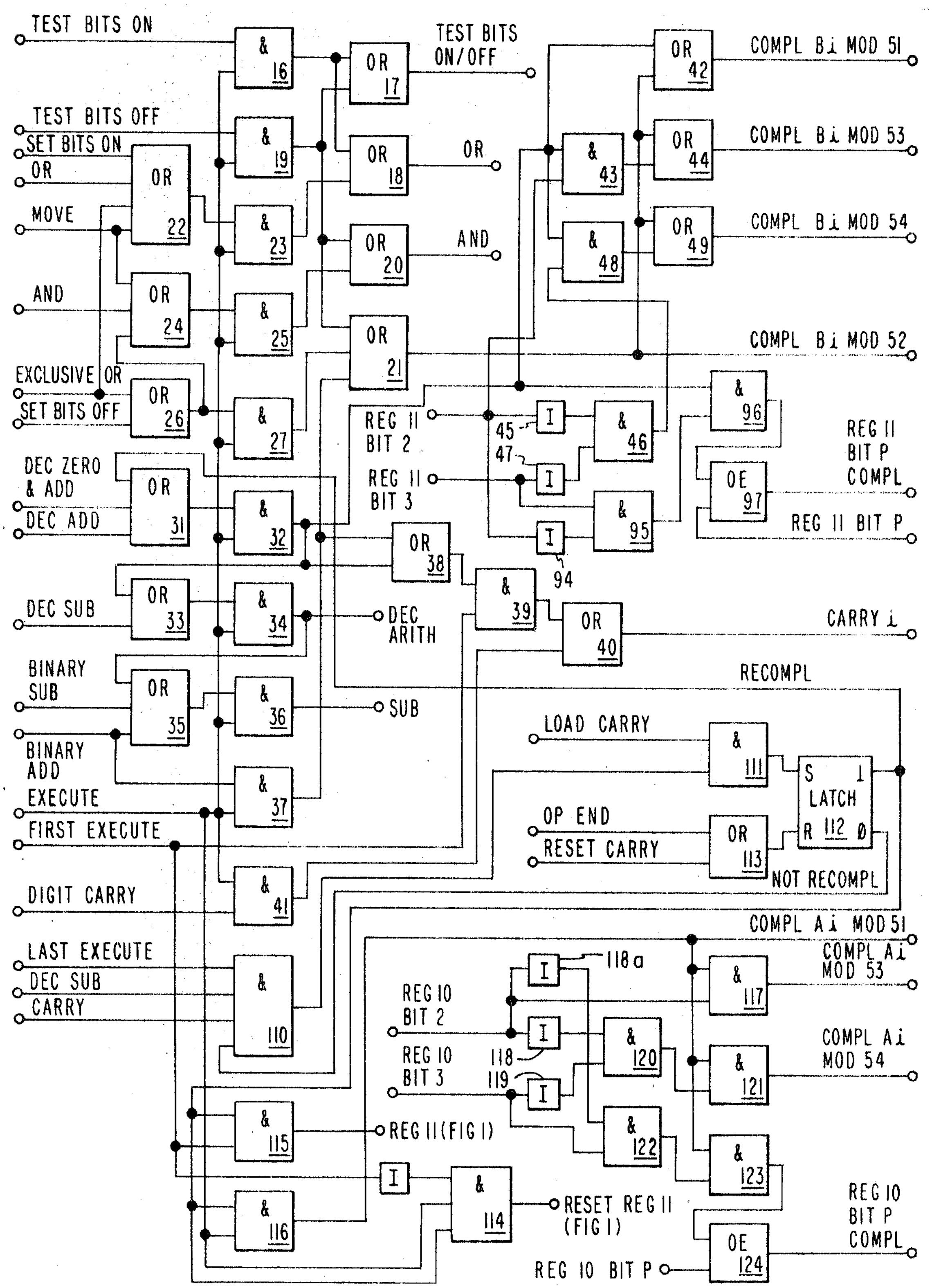
FIG. 4 is a schematic logic diagram illustrating the details of the ALU control.

With reference to FIG. 4, the ALU control 15 includes OR circuit 31 for receiving Decimal Add, Recomplement and Decimal Zero and Add signals. The output of OR circuit 31 is applied to an input of AND circuit 32 which also receives an Execute input signal. The Execute signal is a timing signal which is present, see FIG. 5, for one cycle of operation of the arithmetic and logical unit. Normally, this signal would originate from a central processing unit. The number of Execute signals required for the arithmetic operation is equal to the number of digits in the operands. If each of the operands consists of only one digit, only one Execute signal is required.

The output of AND circuit 32 is applied to OR circuit 42 and AND circuits 43 and 48 to develop Complement $B_i$ control signals. The output of OR circuit 42 connects to the Complement $B_i$ input of module 51. AND circuit 43 also has an input connected to position two of register 11. The output of AND circuit 43 is connected to an input of OR circuit 44 which has its output connected to the Complement $B_i$ input of module 53. AND circuit 48 has an input connected to the output of AND circuit 46 which in turn has inputs connected to outputs of inverters 45 and 47. The inputs to inverters 45 and 47 are connected to positions two and three of register 11 respectively. The output of AND circuit 48 is connected to an input of OR circuit 49 which has its output connected to the Complement $B_i$ input of module 54.

The logic arrangement just described enables the nine's complement function to be performed. Note, for a nine's complement, the low-order bit of register 11 is always changed. The next sequential order bit of register 11, i.e., position two, is never changed for the nine's complement. The bit in position three of register 11 is changed if the bit in position two is a one. This logic of course, is performed by AND circuit 43 which passes its output to OR circuit 44. The bit in position four of register 11, i.e., the high-order bit, is changed if the bits in positions two and three are both zero. This logic is performed by inverters 45, 47, AND circuit 46 and AND circuit 48.

The output of AND circuit 32 is also applied to the input of OR circuit 33 which also has an input for receiving a Decimal Subtract control signal. The Decimal Subtract control signal would come from a central processing unit or other suitable control device. The output of OR circuit 33 is applied to an input of AND circuit 34 which also has an input connected to receive the Execute signal. The output of AND circuit 34 is the Decimal Arithmetic control signal which as indicated earlier herein, is applied to AND circuit 81, FIG. 3, for six correct.

The output of AND circuit 34, FIG. 4, is also applied as an input to OR circuit 35 which also has inputs for receiving the Binary Subtract and Binary Add control signals. These latter signals would emanate from a central processing unit or other suitable control device. The output of OR circuit 35 is applied as input to AND circuit 36 which also receives an Execute control signal. The output of AND circuit 36 is the Subtract signal which is applied to each of the modules 50. It is thus seen that the Subtract signal will be present for both Binary and Decimal arithmetic.

When performing Binary or Decimal arithmetic for the Add function, the forced carry-in signal is generated by AND circuit 37, OR circuit 38, AND circuit 39 and OR circuit 40. AND circuit 37 has inputs to receive the Binary Add and Execute signals. The output of AND circuit 37 is applied to an input of OR circuit 38 which also has an input connected to the output of AND circuit 32. The output of OR circuit 38 is connected to an input of AND circuit 39 which also has inputs for receiving the First Execute signal. For a one digit field, the First Execute signal would be the only Execute signal and therefore, would be the First and Last Execute signal. The output of AND circuit 39 is applied as an input to OR circuit 40 which has its output connected to the carry-in input of module 51. OR circuit 40 also has input connected to the output of AND circuit 41. AND circuit 41 has inputs connected to receive the Execute and Digit Carry signals. The Digit Carry signal come from the set output of latch 105 in FIG. 1. It should also be noted that when performing Binary Addition, the 15's complement is developed because the output of AND circuit 37 is also applied to an input of OR circuit 21, which has its output connected to inputs of OR circuits 42, 44 and 49 and directly connected to the Complement $B_i$ input of module 52. It should also be noted that checking circuitry is provided to determine if in fact the $B_i$ inputs from register 11 were properly complemented. This checking circuitry is shown in FIG. 6.

Figure 6:
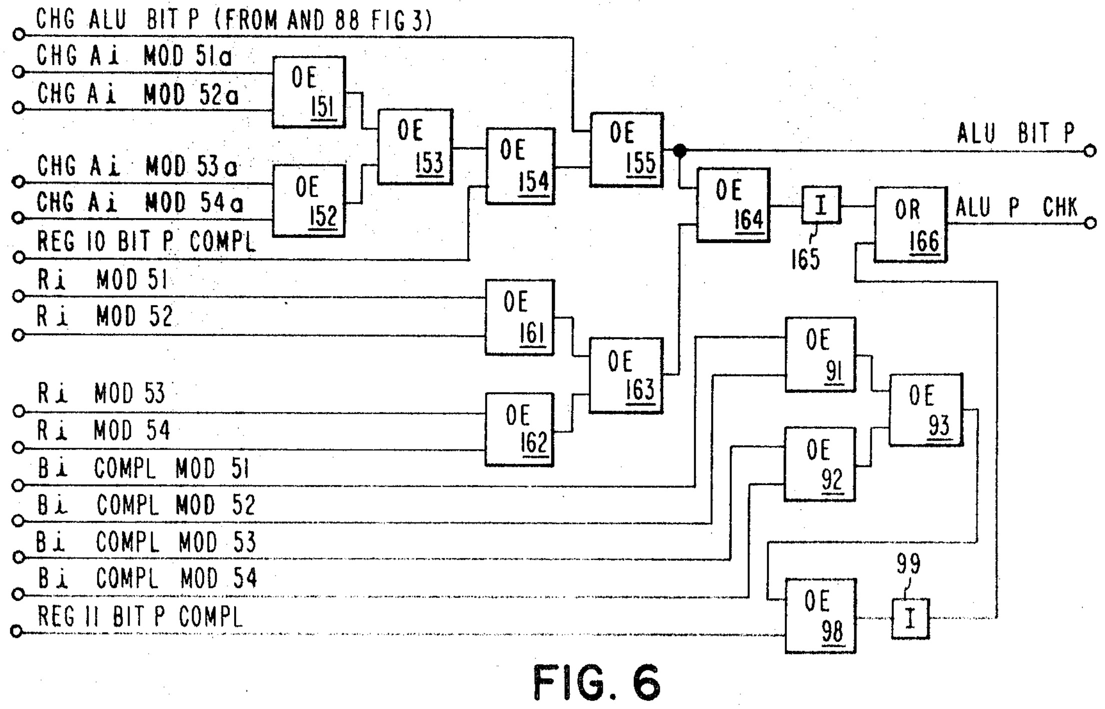
FIG. 6 is a schematic logic diagram illustrating the checking circuitry for the arithmetic and logic unit.

With reference to FIG. 6 it is seen that the outputs of Exclusive OR circuits 68 of modules 51 and 52 are applied as inputs to Exclusive OR circuit 91 and the outputs of Exclusive OR circuits 68 of modules 53 and 54 are applied as inputs to Exclusive OR circuit 92. The outputs of Exclusive OR circuits 91 and 92 are applied to inputs of Exclusive OR circuit 93 which in turn has its output connected to an input of Exclusive Or circuit 98. Exclusive OR circuit 98 also has an input connected to the output of Exclusive OR circuit 97 of FIG. 4. The output of Exclusive OR circuit 98 is connected to an input of inverter 99. A signal from the output of inverter 99 indicates an error condition. Thus, if the outputs from Exclusive OR circuits 93 and 97 are the same, an error exists.

Exclusive OR circuit 97, FIG. 4, has inputs connected to the output of AND circuit 96 and the parity bit (P) position of register 11 respectively. AND circuit 96 has inputs connected to the outputs of AND circuits 32 and 95. AND circuit 95 has inputs connected to the output of inverter 94 and the third bit position of register 11 respectively. Inverter 94 is connected to bit position two of register 11. Thus, AND circuit 95 functions to determine if the bit in position three of the register 11 is a one and the bit in position two is a zero. Exclusive OR circuit 97 essentially functions to complement the parity bit of register 11.

When doing Decimal arithmetic, it is sometimes necessary to recomplement the result to get the correct answer. This requirement exists if there is a carryout of the high-order digit in the field during a true subtract operation. The recomplement operation requires the result to be passed through the arithmetic and logic unit a second time. The results at the output of the arithmetic logic unit, i.e., at the outputs of modules 50, when performing a recomplement, are entered into register 10. A one bit is forced into register 11 during First Execute and the output of register 11 is decimal complemented. The contents of register 10 are also decimal complemented and the decimal complement of register 11 together with the Digit Carry is then subtracted from the decimal complement of register 10.

The recomplement logic includes AND circuit 110, FIG. 4, which has inputs connected to receive a Last Execute signal, a Decimal Subtract signal, a Carry signal from module 54 and a signal from the reset output of latch 112 indicating Not Recomplement. The output of AND circuit 110 is connected to the set input of latch 112 via AND circuit 111. AND circuit 111 is conditioned by a Load Carry timing signal which occurs just before the Execute signal terminates. Normally, the central processing unit would provide the timing signals, however, it is possible to use well-known techniques to develop the timing signals shown in FIG. 5. The reset input of latch 112 is connected to the output of OR circuit 113. OR circuit 113 has an input for receiving an Op End timing signal which occurs during the Last Execute signal. The Reset Carry signal which occurs just prior to the First Execute signal is also applied to an input of OR circuit 113, and to the reset input of carry latch 105 of FIG. 1. The set input of carry latch 105 is connected to the output of AND circuit 100. AND circuit 100 has inputs connected to the Digit Carry output of Module 54, to the ALU control 15 for receiving the Load Carry signal and the Subtract control signal.

The set output of the recomplement latch 112, FIG. 4, is connected to an input of AND circuit 115 which also receives the First Execute signal. The output of AND circuit 115 is connected to the set input of bit position one of register 11 to force a one therein. If the recomplement operation has more than one Execute, then after the First Execute, register 11 is reset to zero and decimal complemented. The resetting of register 11 is under control of AND circuit 114. AND circuit 114 has inputs for receiving the Recomplement, Execute, and Not First Execute signals.

The set output of the recomplement latch 112 is also applied to AND circuit 116 for the purpose of developing Complement $A_i$ control signals. AND circuit 116 also has an input connected to receive the Execute signal. The output of AND circuit 116 is applied directly to the Complement $A_i$ input of module 51 and is applied to inputs of AND circuits 117, 121 and 123 The outputs of AND circuits 117 and 121 are applied to the Complement $A_i$ inputs of modules 53 and 54 respectively. Another input of AND circuit 117 is connected to position two of register 10. This position of the register is also connected to inverter 118 which has its output connected to AND circuit 120. The third position of register 10 is connected to inverter 119 which has its output connected to AND circuit 120. The output of AND circuit 120 is connected to an input of AND circuit 121. Thus, the rules for providing the nine's complement for the bits in register 10 are the same as that for register 11. The P (parity) bit of register 10 is complemented by AND circuits 122 and 123 and Exclusive OR circuit 124.

In order to predict and check the parity of the results, a second set of modules 50a, FIG. 1, are provided. The outputs from OR circuits 74 of these modules are examined to determine whether they are odd or even. This is accomplished by applying the outputs of OR circuits 74 from modules 51a and 52a to inputs of exclusive OR circuit 151 and the outputs of OR circuits 74 for modules 53a and 54a to inputs of Exclusive OR circuit 152, FIG. 6. The outputs of Exclusive OR circuits 151 and 152 are applied to inputs of Exclusive OR circuit 153 which in turn has its output connected to an input of Exclusive OR circuit 154. Exclusive Or circuit 154 also has an input connected to the output of Exclusive OR circuit 124, FIG. 4, for receiving the register 10 parity bit P complemented. The output of Exclusive OR circuit 154 is applied to an input of exclusive OR circuit 155 which also has an input from AND circuit 88, FIG. 3. The output of exclusive OR circuit 155 is considered the parity bit for the arithmetic and logic unit.

The results from modules 50 are also checked. The $R_i$ outputs from Exclusive OR circuits 77 of modules 51 and 52 are applied to inputs of Exclusive OR circuit 161 and the $R_i$ outputs from Exclusive OR circuits 77 of modules 53 and 54 are applied to inputs of Exclusive OR circuit 162. The outputs of Exclusive OR circuits 161 and 162 are connected to inputs of Exclusive OR circuit 163 which has its output connected to an input of Exclusive OR circuit 164 the same also having an input from Exclusive OR circuit 155. The output of Exclusive OR circuit 164 is applied to inverter 165. The output of inverter 165 is connected to OR circuit 166 which also has an input connected to the output of inverter 99. Thus, the output of OR circuit 166 provides an indication of a parity error.

It is seen in FIG. 1 that the Digit Carry is checked by exclusive OR circuit 106 which receives Digit Carry signals from the set outputs of latches 105 and 105a. The set input of latch 105a is connected to AND circuit 100a which has inputs connected to ALU control 15 for receiving the Load Carry and Subtract control signals and to the Digit Carry output of module 54a. A Digit Carry Check occurs if either latch 105 or 105a is set but not both.

In order to understand the decimal arithmetic, examples are given for Decimal Addition with and without overflow and Decimal subtraction.

EXAMPLE

Decimal add without overflow

| | | | | | |
|---|---|---|---|---|---|
| A field---- | 132 | Execute----- | 0010 | (2) | |
| B field---- | +485 | 1st digit----- | −0100 | (5) | Complemented. |
| | | | −0001 | | forced carry in. |
| | | digit carry-- | 1101 | | |
| | | | −0110 | | six correct. |
| | 7 ← | | 0111 | | |
| | | Execute----- 2nd digit---- | 0011 | (3) | |
| | | | −0001 | (8) | complemented. |
| | | | −0001 | | digit carry in. |
| | 1 ← | | 0001 | | no carry, no six correct. |
| | | Execute----- 3rd digit---- | 0001 | (1) | |
| | | | −0101 | (4) | complemented. |
| | | | −0000 | | no digit carry in. |
| | | carry* | 1100 | | |
| | | | −0110 | | six correct. |
| | 6 ← | | 0110 | | |

*The presence of this final carry indicates that there is no decimal overflow.

EXAMPLE

Decimal Add With Overflow

| | | | | | |
|---|---|---|---|---|---|
| A field | 132 | Execute | 0010 | (2) | |
| B field | +885 | 1st digit | −0100 | (5) | complemented. |
| | | | −0001 | | forced carry in. |
| | | digit carry | 1101 | | |
| | | | −0110 | | six correct. |
| | 7 | | 0111 | | |
| | | Execute | 0011 | (3) | |
| | | 2nd digit | −0001 | (8) | complemented. |
| | | | −0001 | | digit carry in. |
| | 1 | | 0001 | | no carry, no six correct. |
| | | Execute | 0001 | (1) | |
| | | 3rd digit | −0001 | (8) | complemented. |
| | | | −0000 | | no digit carry in. |
| | 0 | | 0000 | | no carry* no six correct. |

*The absence of a final carry indicates that a decimal overflow occurred.

EXAMPLE

Decimal Subtract

| | | | | | |
|---|---|---|---|---|---|
| A field | 527 | Execute | 0111 | (7) | |
| B field | −172 | 1st digit | −0010 | (2) | |
| | 5 | | 0101 | | |
| | | Execute | 0010 | (2) | |
| | | 2nd digit | 0111 | (7) | |
| | | digit carry | 1011 | | |
| | | | −0110 | | six correct. |
| | 5 | | 0101 | | |
| | | Execute | 0101 | (5) | |
| | | 3rd digit | −0001 | (1) | |
| | | | −0001 | | |
| | 3 | | 0011 | | |

With reference to the Decimal Add Without Overflow example, the low-order digit two of the A field is placed into register 10 and the low-order digit five of the B field is placed into register 11. A First Execute cycle is taken and during this cycle, the contents of register 11 is complemented and a forced carry-in is supplied to module 51. The subtract operation takes place and a digit carry results. In view of the digit carry, a six correct operation takes place. The first digit of the sum has now been generated. A second execute cycle takes place to add the second digits of the A and B fields. During this operation, no-carry is generated and hence, a six correct operation does not take place. Another execute cycle takes place to operate upon the third digits of the A and B fields. During this operation, the digit carry does result and this causes a six correct operation to take place.

The Decimal Add With Overflow example differs in that the absence of a final carry indicates that a decimal overflow did take place.

The Decimal Subtract example illustrates that for the first digits of the A and B field, a subtract operation takes place without six correct. However, for the second digits of these fields, there is a digit carry and therefore, a six correct operation takes place. The third digits of the A and B fields do not cause a carry to be generated during the subtract operation, and therefore, a six correct operation does not take place.

A recomplement operation is illustrated by the following example.

EXAMPLE

Subtract—Recomplement

| | | | | | |
|---|---|---|---|---|---|
| A field | 172 | | | | |
| B field | −527 | | | | |
| | | $A_i$ | 0010 | | |
| | | $B_i$ | −0111 | | |
| | | dc | 1011 | | |
| | | | −0110 | six correct | |
| | 5 | | 0101 | | |
| | | $A_i$ | 0111 | | |
| | | $B_i$ | −0010 | | |
| | | | −0001 | carry | |
| | 4 | | 0100 | | |
| | | $A_i$ | 0001 | | |
| | | $B_i$ | −0101 | | |
| | | dc | 1100 | | |
| | | | −0110 | six correct | |
| | 6 | | 0110 | | |
| | | Recomplement | | | |
| A field | −645 | | | | |
| B field | −001 | | | | |
| | | $A_i$ | 0100 | 9's compl of ($A_i$=5) | |
| | | $B_i$ | −1000 | 9's compl of ($B_i$=1) | First Execute. |
| | | | −0001 | carry | of recomp force. |
| | | dc | 1011 | | 1 in B. |
| | | | −0110 | six correct | |
| | 5 | | 0101 | | |
| | | $A_i$ | 0101 | 9's compl of ($A_i$=4) | |
| | | $B_i$ | −1001 | 9's compl of ($B_i$=$\phi$) | force $\phi$ in B. |
| | | | −0001 | carry | during recomp. |
| | | dc | 1011 | | Execute not. |
| | | | −0110 | six correct | First Execute. |
| | 5 | | 0101 | | |
| | | $A_i$ | 0011 | 9's compl of ($A_i$=6) | |
| | | $B_i$ | −1001 | 9's compl of ($B_i$=$\phi$) | |
| | | | −0001 | carry | |
| | | | 1001 | | |
| | | | −0110 | six correct | |
| | −3 | | 0011 | | |

Note that Decimal Subtraction is being performed.

A carryout of the high-order digit during the subtract operation indicates that the results must be recomplemented. The sign of the result is assumed to be the sign of the A field. During the First Execute of the recomplement operation, a one is entered into register 11 and the nine's complement thereof is taken. The digit carry is applied to module 51. The result causes a six correct operation to take place and the first, i.e., low order digit, is thus developed. The other digits are developed as shown. The sign of the A field changed during the recomplement operation.

All of the logical operations are accomplished by AND circuits 72 and 73 of modules 50, FIG. 2. The logical AND function is generated when ALU control 15 provides an AND control signal to AND circuit 73. The AND control signal is developed by OR circuit 24, AND circuit 25 and OR circuit 20 of FIG. 4. The operation can best be understood by the following example:

EXAMPLE: AND

| | | | | |
|---|---|---|---|---|
| A field--- | 0110 | $A_i$ | 0110 | |
| B field--- | 1010 | $\bar{B}_i$ | 0101 | |
| | | $A_i\bar{B}_i$ | 0100 | change $A_i$. |
| | | $A_i(OE)A_i\bar{B}_i$ | 0010 | |

Note that when the And function is performed, the B field is inverted by inverters 75, Fig. 2. The output of AND circuits 73 are applied via OR circuits 74 to Exclusive OR circuits 76. According to the example given, only one bit of the A field is changed, and that is the bit in position three of register 10. Further, since the Change $r_i$ line will not have a signal thereon, the output of Exclusive OR circuit 77 will be the same as 76.

The OR function takes place when ALU control 15 provides an OR control signal to AND circuit 72. The OR control signal is developed by OR circuit 22, AND circuit 23 and OR circuit 18 of FIG. 4. The following example illustrates the OR function:

EXAMPLE: OR

| | | | | |
|---|---|---|---|---|
| A field--- | 0110 | $\bar{A}_i$ | 1001 | |
| B field--- | 1010 | $B_i$ | 1010 | |
| | | $\bar{A}_iB_i$ | 1000 | change $A_i$. |
| | | $A_i(OE)\bar{A}_iB_i$ | 1110 | |

When performing the OR function, it is seen that the bits of the A field are inverted by inverters 67, FIG. 2. The outputs of AND circuits 72 are passed via OR circuits 74 to Exclusive OR circuits 76. The outputs of the AND circuits 72 cause only one bit of the A field to be changed and that is the bit in position four of register 10.

If ALU control 15 provides control signals for both AND and OR, i.e., by simultaneously applying the OR and AND signals to OR circuits 22 and 24 of FIG. 4, the contents of register 11 appears at the outputs of the modules 50. The following example illustrates this operation:

EXAMPLE: AND-OR

| | | | | | |
|---|---|---|---|---|---|
| A field--- | 0110 | $A_i$ | 0110 | $\bar{A}_i$ | 1001 |
| B field--- | 1010 | $\bar{B}_i$ | 0101 | $B_i$ | 1010 |
| | | | + | | |
| | | $A_i\bar{B}_i$ | 0100 | $\bar{A}_iB_i$ | 1000 |
| | | $A_i\bar{B}_i+\bar{A}_iB_i$ | 1100 | change $A_i$. | |
| | | $A_i(OE)A_i\bar{B}_i+\bar{A}_iB_i$ | 1010 | | |

It is seen that the outputs of OR circuits 74 results from the outputs of AND circuits 72 and 73. OR circuits 74 for modules 53 and 54 pass one bits, while OR circuits 74 for modules 51 and 52 pass zero bits. Thus, Exclusive OR circuits 76 for modules 51 and 52 will pass the associated bits from register 10 whereas the associated bits in register 10 will be changed by the Exclusive OR circuits 76 for modules 53 and 54. It is seen that the result is the same as the contents in register 11, i.e., the B field.

If ALU control 15 does not provide any control signals, the contents of register 10, i.e., the A field, will appear at the output of the modules 50. No example is required to illustrate this operation, because with reference to FIG. 2, it is seen that OR circuits 74 will not provide any change bits to Exclusive OR circuits 76 and therefore, the Exclusive OR circuits 76 will pass the inputs from register 10 to Exclusive OR circuits 77 and since no Change $r_i$ signals are present, Exclusive OR circuits 77 will pass the inputs from Exclusive OR circuits 76 to the outputs of the modules 50.

The modules 50 when performing logical operations can be grouped into a word for the logical operations Test Bits On and Test Bits Off. For these operations, the outputs of OR circuits 74 which provide a signal indicating Change $A_i$ are connected to inputs of OR circuit 180, FIG. 1. The output of OR circuit 180 is applied to AND circuit 181 together with an input from OR circuit 17, FIG. 4 of ALU control 15 for controlling the Test Bits On-Test Bits Off operations. In FIG. 4, Test Bits On is applied to AND circuit 16 together with Execute. The output of AND circuit is applied to OR circuits 17 and 18. When performing the Test Bits On function, ALU control 15 also provides an OR control signal from OR circuit 18 which is applied to modules 50. The Test Bits On signal from OR circuit 17, FIG. 4, is applied to AND circuit 181, FIG. 1. The test is false if any of the OR circuits 74 of modules 50 pass a signal to OR circuit 180. The Test Bits On operation tests $A_i$ for On if $B_i$ is On. The following example illustrates Test Bits On for where the Test is false and true respectively.

EXAMPLE

Test Bits On

| | | | | |
|---|---|---|---|---|
| A field--- | 0110 | $\bar{A}_i$ | 1001 | |
| B field--- | 1010 | $B_i$ | 1010 | |
| | | $\bar{A}_iB_i$ | 1000 | Change $A_i$. Test is false. |
| A field--- | 1110 | $\bar{A}_i$ | 0001 | |
| B field--- | 1010 | $B_i$ | 1010 | |
| | | $\bar{A}_iB_i$ | 0000 | No change $A_i$. Test is true. |

The Test Bits Off operation is controlled by the Complement $B_i$ and AND control signals from ALU control 15. In FIG. 4, it is seen that a Test Bits Off signal is applied to an input of AND circuit 19 which also receives an Execute signal. The output of AND circuit 19 is applied to inputs of OR circuits 17, 20 and 21. The connections of the outputs of OR circuits 17, 20 and 21 have previously been described. Test Bits Off tests $A_i$ for Off if $B_i$ is On. The test is false if any of the OR circuits 74 of modules 50 provide an output signal. The following example illustrates Test Bits Off where the test is false and true respectively.

EXAMPLE

Test Bits Off

| | | | | |
|---|---|---|---|---|
| A field--- | 0110 | $A_i$ | 0110 | |
| B field--- | 1010 | $\overline{B_i\ \mathrm{Comp}}$ | 1010 | |
| | | $A_i\overline{B_i\ \mathrm{Comp}}$ | 0010 | Change $A_i$. Test is false. |
| A field--- | 0100 | $A_i$ | 0100 | |
| B field--- | 1010 | $\overline{B_i\ \mathrm{Comp}}$ | 1010 | |
| | | $A_i\overline{B_i\ \mathrm{Comp}}$ | 0000 | no Change $A_i$. Test is true. |

The logical function Set Bits On is accomplished when ALU 15 applies the OR control signal to modules 50. In this instance, the OR control signal is generated by applying the Set Bits On signal to OR circuit 22. The function is to set an $A_i$ bit position On if a corresponding $B_i$ bit is On. The following example illustrates this operation:

EXAMPLE

Set Bit On

| | | | | |
|---|---|---|---|---|
| A field--- | 0110 | $\bar{A}_i$ | 1001 | |
| B field--- | 1010 | $B_i$ | 1010 | |
| | | $\bar{A}_iB_i$ | 1000 | Change $A_i$. |
| | | $A_i(OE)\bar{A}_iB_i$ | 1110 | 4th $A_i$ bit. set on. |

The Set Bits Off logical operation is performed by providing the Complement $B_i$ and AND control signals to the modules 50. The Complement $B_i$ signals for modules 50 are generated by applying the Set Bits Off signal to OR circuit 26. The output of OR circuit 26 is applied to inputs of OR circuit 24 and AND circuit 27. The output of AND circuit 27 is applied to an input of OR circuit 21. The AND control signal results from applying the output of OR circuit 26 as an input to OR circuit 24. The Set Bits Off operation causes the $A_i$ bit to be set off if the corresponding $B_i$ bit is On. The following example illustrates the Set Bits Off operation:

EXAMPLE

Set Bit Off

| | | | | |
|---|---|---|---|---|
| A field . . . 0110 | $A_i$ | 0110 | | |
| B field . . . 1010 | $\overline{B_i \text{ Comp}}$ | 1010 | | |
| | $A_i\overline{B_i \text{ Comp}}$ | 0010 | Change $A_i$. | |
| | $A_i(\text{OE})\overline{A_iB_i \text{ Comp}}$ | 0100 | 2nd $A_i$ bit. set off. | |

The logical function of Exclusive OR is performed when ALU control 15 provides the control signals, Complement $B_i$, AND, OR to the modules 50. The Exclusive OR signal is applied to OR circuit 22 to develop the OR control signal and to OR circuit 26 to develop the AND and Complement $B_i$ control signals. The following example illustrates the Exclusive OR function.

EXAMPLE

Exclusive OR

| | | | | |
|---|---|---|---|---|
| A field . . . 0110 | $A_i$ | 0110 | $\overline{A}_i$ | 1001 |
| B field . . . 1010 | $\overline{B_i \text{ Comp}}$ | 1010 | $B_i$ | 1010 |
| | $A_iB_i\overline{\text{Comp}}$ | 0010 | $\overline{A}_iB_i$ | 1000 |
| | $A_i\overline{B_i \text{ Comp}}+\overline{A}_iB_i$ | 1010 | Change $A_i$. | |
| | $A_i(\text{OE})A_i\overline{B}_i\overline{\text{Comp}}+\overline{A}_i+B_i$ | 1100 | bits 2 and 4 of $A_i$ are changed. | |

Figure 7:
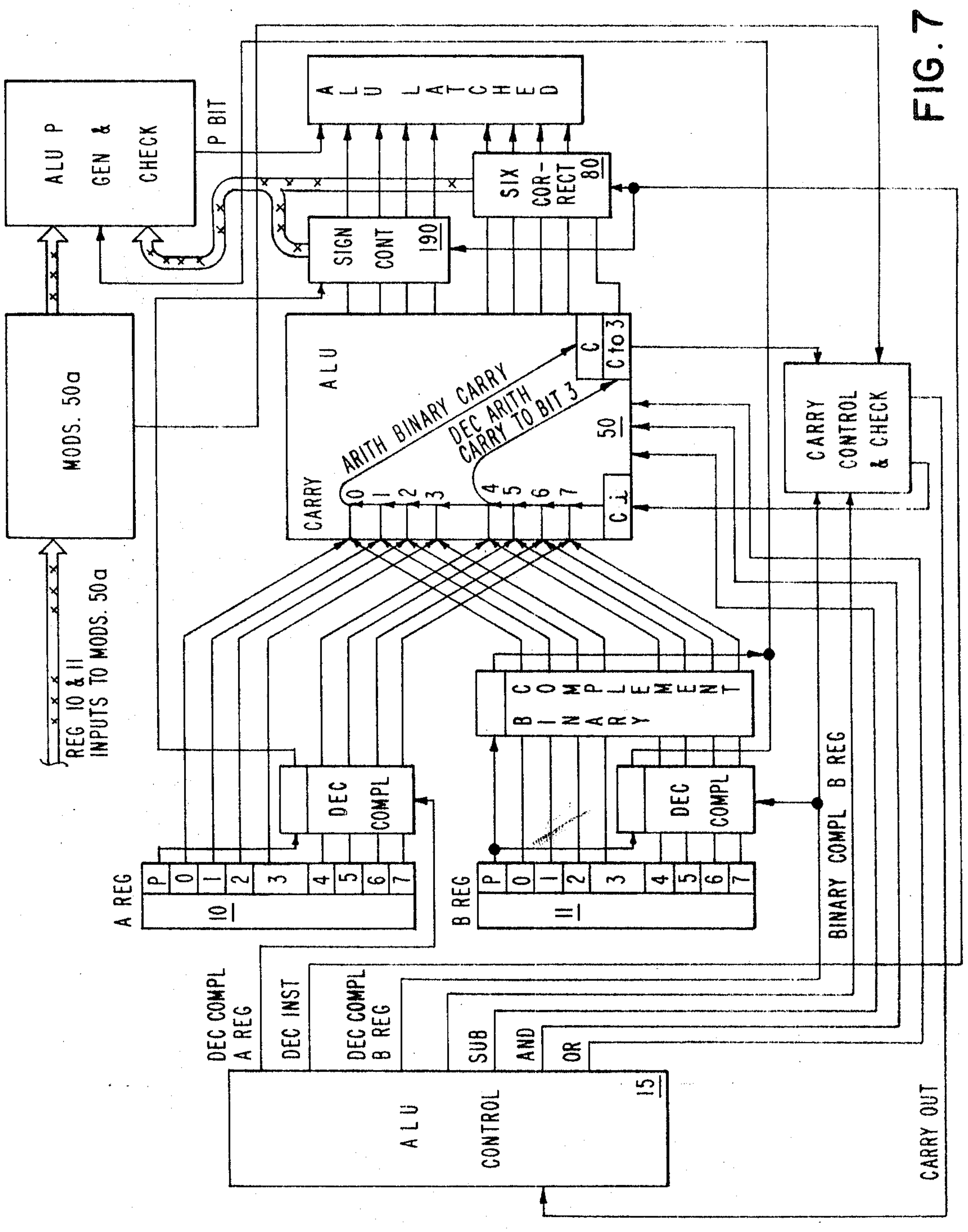
FIG. 7 is a schematic diagram illustrating the invention in block form as embodied with eight modules for the arithmetic and logic unit.

It should be noted that a straight binary compare of factor A with factor B is accomplished by simply providing a Subtract control signal to the modules 50 and examining the result $R_i$ and the carryout of the high order module 54. The following example illustrates this Compare function:

EXAMPLE Binary Compare $A=B$ if $R_i=0$ $A>B$ if $R_i\neq0$ and no carryout
$A<B$ if $R_i\neq0$ and carryout FIG. 7 illustrates the invention where registers 10 and 11 each have eight data bit positions and one parity bit. Position seven is the low-order bit position. Bits seven through four inclusive are used for decimal arithmetic. Further, when performing decimal arithmetic, bits zero—three inclusive are used for representing the sign. The bits zero—three inclusive are examined by Sign Control logic 190. A plus sign is represented by one bits for the bits zero—three inclusive. A minus sign is represented by one bits for the bits zero—three inclusive, except for the two bit, which is zero. It is thus seen that the two bit is the only bit that will be changed when the sign changes.

Figures 8, 9:
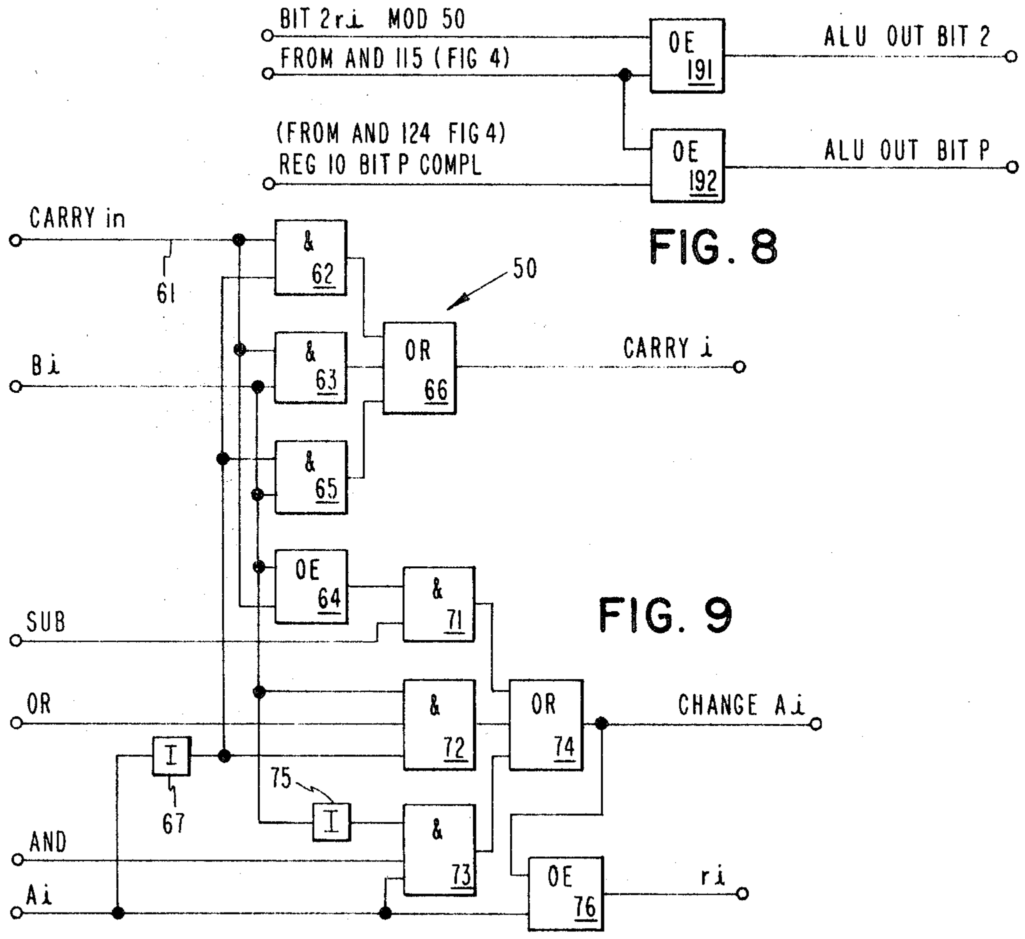
Fig. 8 is a schematic logic diagram illustrating the details of the sign control logic shown in block form in FIG. 7; and, FIG. 9 is a schematic logic diagram illustrating the arithmetic and logic unit module of the modules shown in block form in FIG. 7.

The details of the sign control logic 190 are shown in FIG. 8. Essentially, the sign control logic 190 consists of Exclusive OR circuits 191 and 192. Each of these Exclusive OR circuits has an input connected to the output of AND circuit 115, FIG. 4. Exclusive OR circuit 191 also has an input connected to the $r_i$ output of Exclusive OR circuit 76 of module 50 shown in FIG. 9. It should be noted that module 50 of FIG. 9 is slightly different from the module 50 of FIG. 2. This is because the complementing circuitry is shown in FIG. 7 as being separate from the ALU control circuitry 15. The Exclusive OR circuits 68 and 69 in FIG. 7 are considered to be part of the complementing circuitry. Also, the Exclusive OR circuits 77 are part of the six correct circuitry in FIG. 7. Exclusive OR circuit 192 has an input connected to the output of Exclusive OR circuit 124 to receive the register 10 bit P complemented signal.

The arithmetic and logic unit of FIG. 7 functions substantially the same as that shown in FIG. 1. However, in FIG. 7, the outputs of the ALU modules 50 are shown as being latched. Also, with the eight bits as shown in FIG. 7, it is possible to treat groups of four bits as a digit whereby registers 10 and 11 would each contain two digits.

From the foregoing it is seen that the invention provides an arithmetic and logic unit where one operand is base data and the other is a modifier. It is also seen that the carry signal is limited to the arithmetic functions of the unit and is excluded from the logical operations. Further, it is seen that the invention is configured as a parallel subtracter and can perform the arithmetic functions of addition and subtraction for both binary and decimal arithmetic. It is also seen that the number of logic functions are expanded and require only three control lines to perform the operations of Move Operand 1, Move Operand 2, AND, OR, Set Bits On, Set Bits Off, Exclusive OR, Test Bits On and Test Bits Off.

I claim:

1. An arithmetic and logic unit for selectively performing arithmetic and logical operations on pairs of input signals and carry-in signals representing data in coded form under control of arithmetic and logic control signals comprising:

a plurality of logical modules, one for each pair of input signals and arranged in sequential order positions from low to high order, said modules each including:

Logical elements responsive to a carry-in signal and a not input signal of one input signal of said pair of input signals, to a carry-in signal and the other input signal of said pair of input signals and to said not input signal of said one input signal and said other input signal to develop a carryout signal;

logical elements responsive to said other input signal and said carry-in signal and an arithmetic control signal to develop a first change bit signal;

logical elements responsive to said other input signal and said not input signal of said one signal and a first logic control signal to develop a second change bit signal;

logical elements responsive to a not signal of said other input signal and said one input signal and a second logic control signal to develop a third change bit signal, and means for receiving said one input signal and for passing said one input signal in response to the absence of said first, second or third change bit signals and for changing the state of said one input signal in response to the presence of said first, second or third change bit;

means for applying the carryout signal from the module of one order position as a carry-in signal to the module of the adjacent higher order position; and control means for selectively applying a carry-in signal to the low-order position module and for selectively generating a plurality of control signals including said arithmetic and said first and second logic control signals.

2. The arithmetic and logic unit of claim 1 wherein said first logic control signal is an OR control signal and said second logic control signal is an AND control signal.

3. The arithmetic and logic unit of claim 1 wherein said means for receiving said one input signal includes a logical OR circuit connected to receive said first, second and third change bit signals and an exclusive OR circuit connected to receive said one input signal and the output of said logical OR circuit.

4. The arithmetic and logic unit of claim 1 further comprising:

a logical OR circuit connected to receive said first, second and third change bit signals from each module; and a logical AND circuit connected to receive output signals from said logical OR circuit and said control means to perform Test Bits On-off operations.

5. The arithmetic and logic unit of claim 1 further comprising:

a six correct circuit connected to receive output signals from said modules except the low order module and to receive a carryout signal from the high-order module and a control signal from said control means and generating output signals in response to a carryout signal from said high-order module and output signals from said modules except the low-order module for changing the output signals of said modules except said low-order module; and means responsive to output signals from said six correct circuit and the outputs of said modules except said low-order module for changing the outputs of said modules except said low-order module.

6. The arithmetic and logic unit of claim 5 wherein said means responsive to signals from said six correct circuit and the outputs of said modules except said low-order module includes an exclusive OR circuit for each module except said low-order module.

7. An arithmetic and logic unit comprising:

first and second registers having a plurality of bit positions for storing bits of first and second operands, said first operand being base data and said second operand being modifying data;

control means selectively operable to provide a plurality of control signals including an arithmetic control signal and a carry-in signal;

first logic means having a number of logic modules corresponding to the number of bit positions of said first and second registers, said modules being arranged in sequential order positions from low to high order, each logic module having a carry-in input, first and second register bit inputs and an input for receiving said arithmetic control signal and having a carryout output and a change first operand output, the modules being configured as a subtracter where the carryout output of one module is connected to the carry-in input of the module in the adjacent higher order position, the carry-in input of the low order module being connected to said control means to receive said carry-in signal and the first and second register bit inputs of each module being connected to corresponding bit positions of said first and second registers, said modules being responsive to generate a carryout signal if said carry-in signal is simultaneously present with a bit absent signal from a corresponding bit position in said first register and responsive to generate a change first operand signal if a carry-in signal is simultaneously present with the absence of a bit from the corresponding bit position of said second register or if a carry-in signal is simultaneously absent with the presence of a bit from the corresponding bit position of said second register; and second logic means connected to said first register and said first logic means and operative to change or not change the bit conditions of said first operand depending upon receiving or not receiving change first operand signals from said first logic means.

8. The arithmetic and logic unit of claim 7 wherein said second logic means comprises:

exclusive OR circuits, one for each bit position of said plurality of bit positions.

9. The arithmetic and logic unit of claim 7 further comprising:

third logic means connected to said first and second registers and to said control means for receiving logic control signals and responsive to the bit conditions of said first and second operands and said logic control signals for generating control signals at one level if the bits of said first operand are to be changed and at another level if the bits of said first operand are not to be changed; and means for applying said control signals generated by said third logic means to said second logic means.